Nov. 11, 1930.  M. J. ANDERSON  1,781,424
CONVEYING AND SPACING APPARATUS
Original Filed April 9, 1927   4 Sheets-Sheet 4
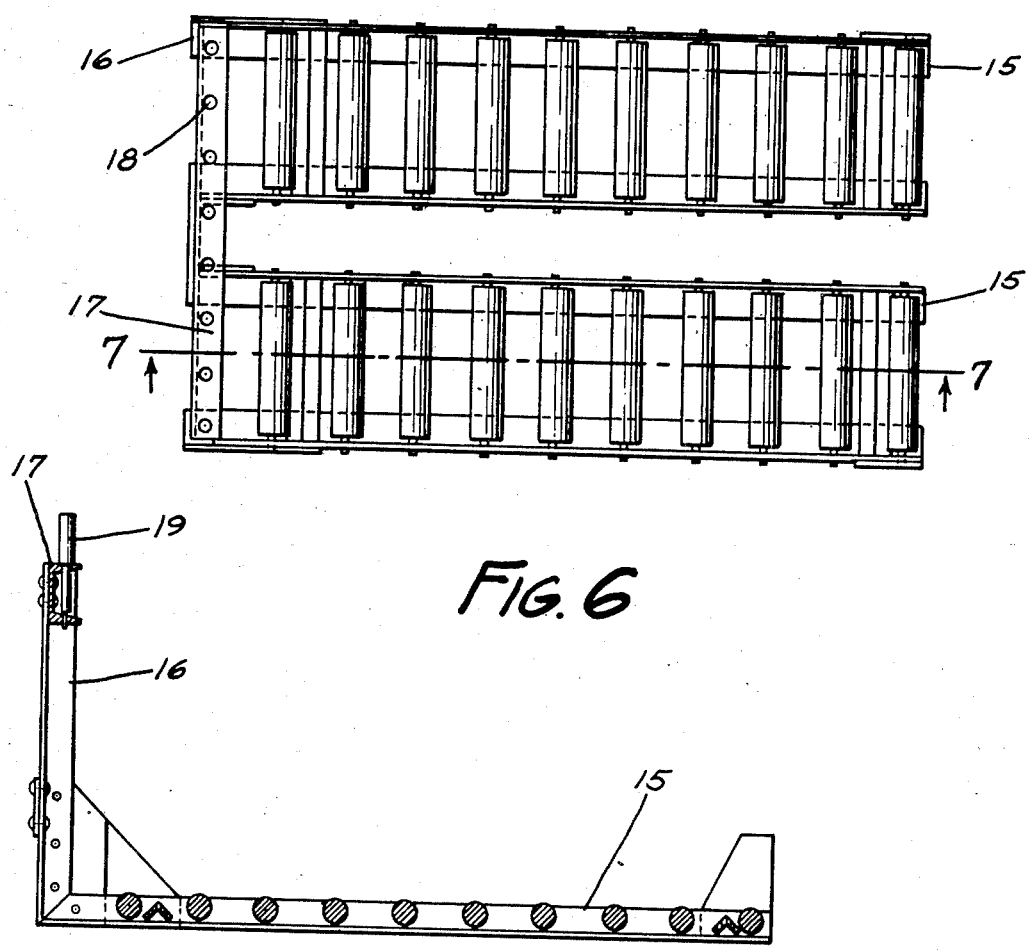
FIG. 6
FIG. 7
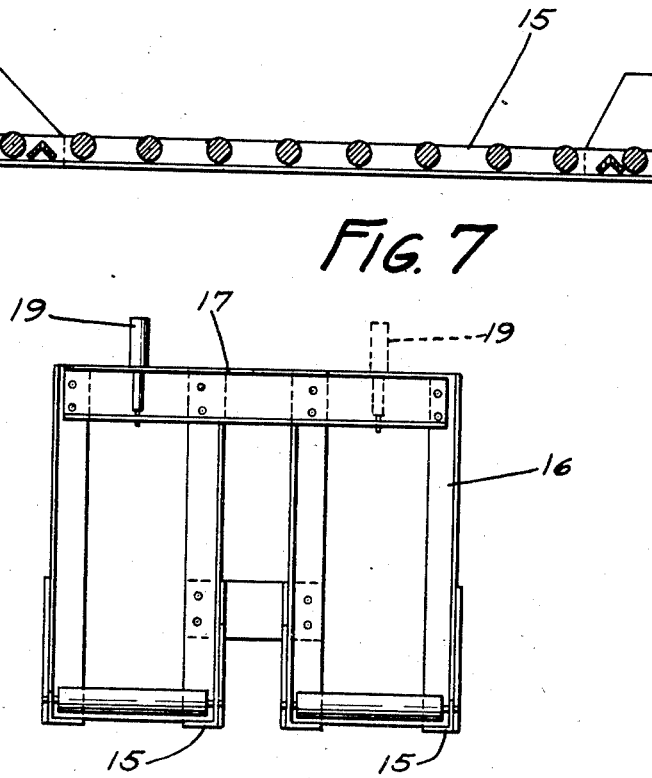
FIG. 8
INVENTOR
MARTIN J. ANDERSON
By
ATTORNEYS Patented Nov. 11, 1930

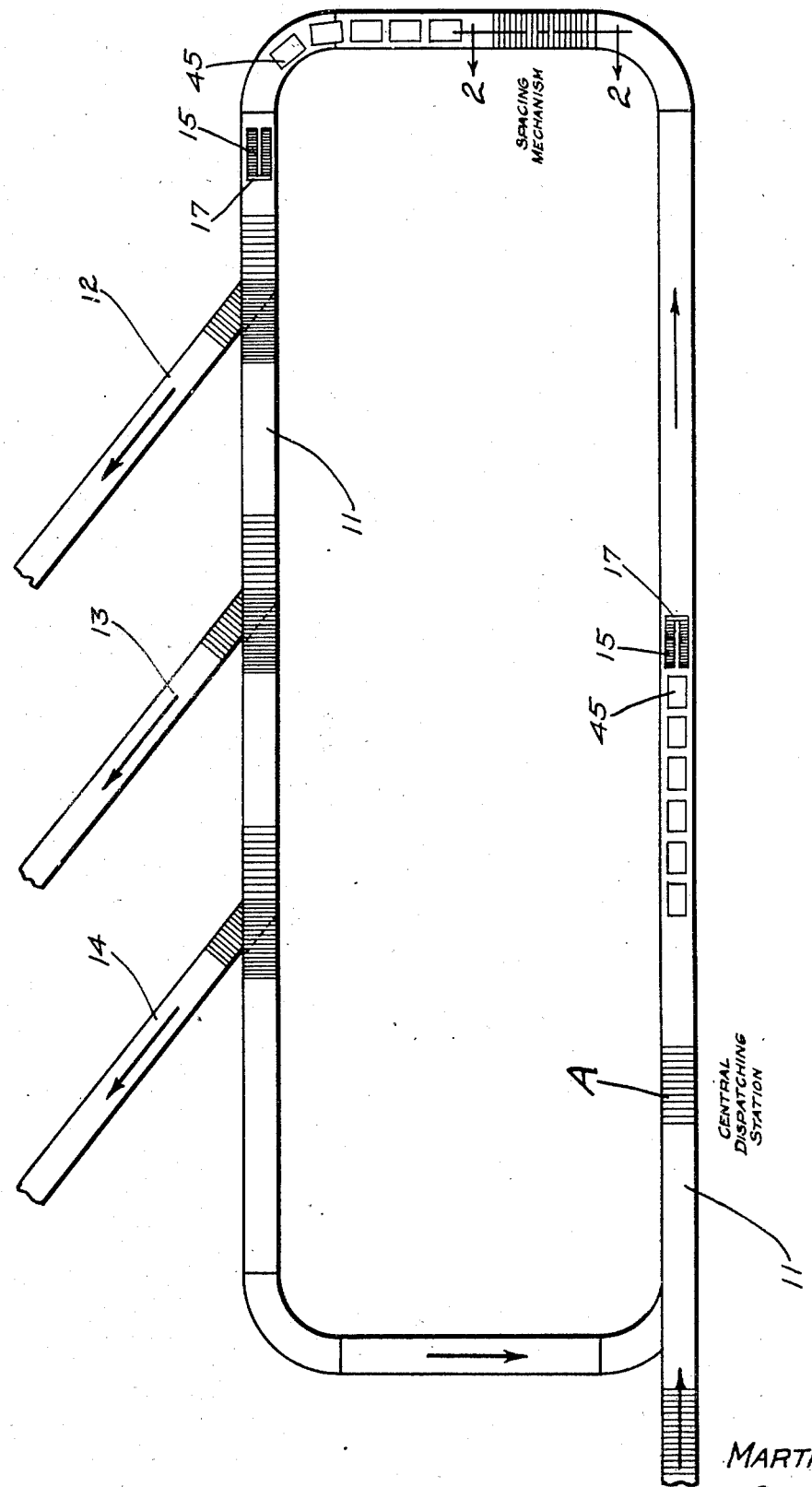

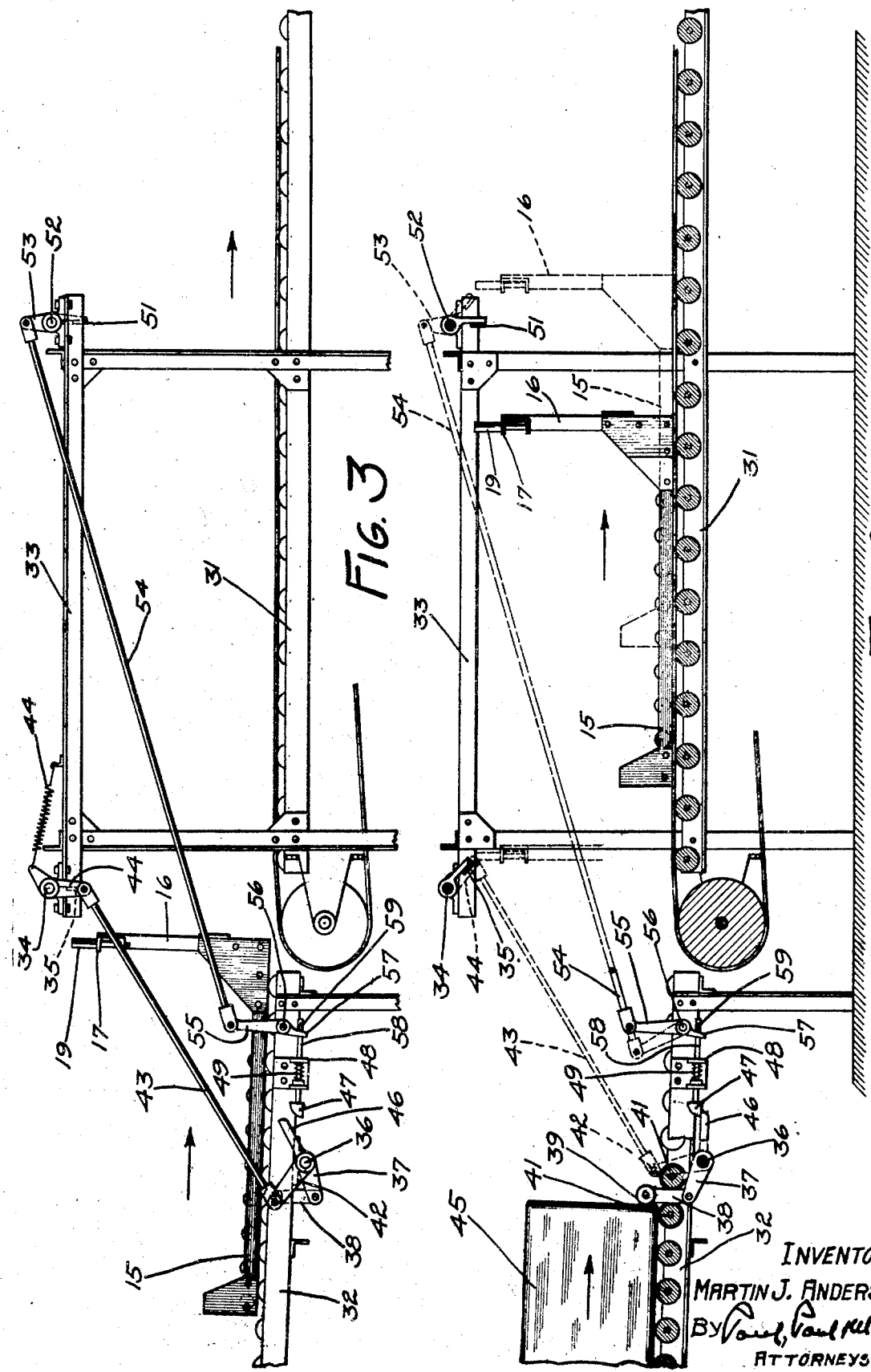

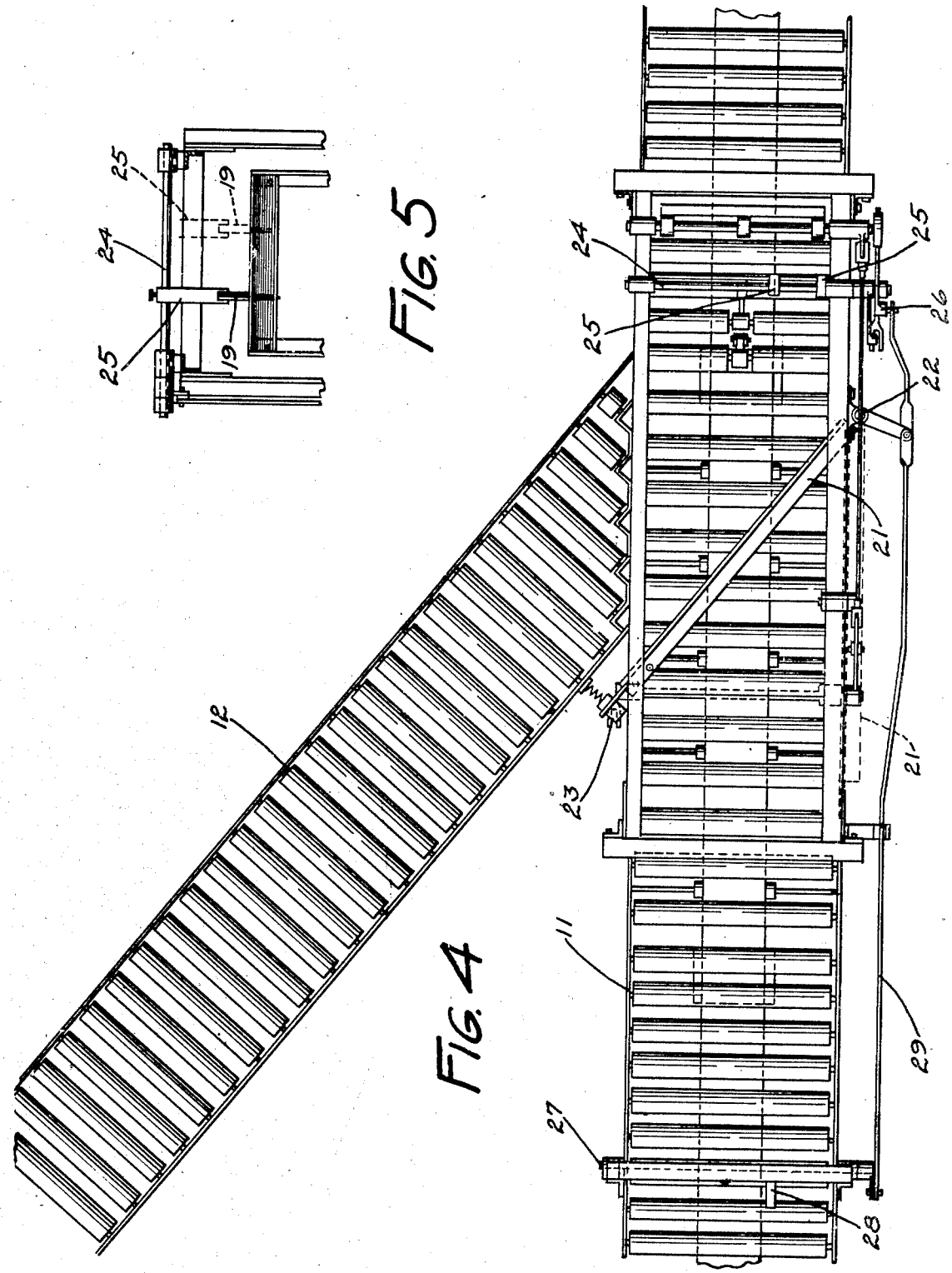

1,781,424

UNITED STATES PATENT OFFICE

MARTIN J. ANDERSON, OF ELLWOOD CITY, PENNSYLVANIA, ASSIGNOR TO MATHEWS CONVEYER COMPANY, OF ELLWOOD CITY, PENNSYLVANIA, A CORPORATION OF PENNSYLVANIA

CONVEYING AND SPACING APPARATUS

Application filed April 9, 1927, Serial No. 182,509. Renewed September 11, 1930.

This invention relates to new and useful improvements in conveying and spacing apparatus, generally, and more particularly to such apparatus of the type set forth in my prior pending applications, Serial Nos. 169,281 and 169,282, filed, respectively, February 18, 1927.

An object of the present invention is to provide a spacing mechanism operable in connection with a conveying apparatus employing a routing tray adapted to be sent over the conveying system in advance of following articles to operate certain mechanisms, to cause the diversion of such following articles from a main conveyer onto a selected branch conveyer, the purpose of the spacing mechanism being to space the first following article a predetermined distance from the routing tray in order that the routing tray will have sufficient time to operate the diverting mechanism before the latter is engaged by the following article.

Other objects of the invention are, to provide such a mechanism of simple and inexpensive construction and which will be positive in performance; to provide a spacing mechanism adapted to be operated by a control means positioned upon the routing tray; the constructional details of the spacing mechanism which includes a stop member normally positioned beneath the top surface of the conveyer and having means connecting it with a rock shaft adapted to be actuated by a control means on the routing tray, to move said stop member into the path of the articles traveling over the conveyer; the spring-actuated means for temporarily holding the stop member in raised operative position; and in the provision of a second rock shaft having a connection with said spring-actuated means and also adapted to be actuated by the control means of the routing tray for releasing the stop member to allow it to return to its normal inoperative position beneath the surface of the conveyer.

The particular object of the invention therefore, is to provide an improved spacing mechanism operable in connetion with a conveying apparatus employing a routing tray adapted to be sent over the conveyer for selectively operating certain mechanisms to cause the diversion of articles therefrom and whereby the leading article following the routing tray will be spaced a predetermined distance therefrom.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the accompanying drawings forming part of this specification;

Figure 1 is a diagrammatic plan view of a conveying apparatus showing the location of the improved spacing mechanism therein;

Figure 2 is a vertical sectional view on the line 2—2 of Figure 1 showing the improved spacing mechanism with its stop member positioned to engage an article;

Figure 3 is an elevational view of the stop mechanism;

Figure 4 is a plan view showing the article-diverting mechanism provided at the junctions between the main conveyer and the branch conveyers for selectively diverting articles from the main conveyer;

Figure 5 is a detailed sectional view showing the control means on the routing tray positioned to engage the diverting mechanism;

Figure 6 is a plan view of the routing tray;

Figure 7 is a longitudinal sectional view on the line 7—7 of Figure 6; and

Figure 8 is an end view of Figure 7.

In the selected embodiment of the invention here shown, for purposes of disclosure, there is illustrated, diagrammatically, in Figure 1, a conveyer system comprising a main conveyer 11 having a plurality of branch conveyers 12, 13, and 14, leading therefrom to suitable destinations such, for instance, as storage bins. The main conveyer 11 is provided at the junction of each branch conveyer with an article-diverting mechanism adapted to be operated by a control means positioned upon a routing tray adapted to be sent over the conveyer system in advance of articles to selectively operate such mechanism.

The routing tray is shown in detail in Figures 6, 7, and 8, and comprises a pair of spaced roller conveyer sections 15 having their forward ends suitably connected together by an upright frame 16. A cross member 17 comprises the upper portion of the frame 16 and has a plurality of apertures 18 provided therein adapted to receive a control pin 19, as shown in Figures 7 and 8.

The diverting mechanisms provided at the junctions between main conveyer and branch conveyers, is shown in Figure 4, and includes a deflector 21 pivotally mounted upon an upright shaft 22 provided at one side of the main conveyer 11. This deflector is normally positioned as shown in dotted lines in Figure 4 and is adapted to be swung to its operative position across the main conveyer as shown in full lines in this same figure. A spring-actuated latch 23 normally holds the deflector in its operative position. A rock shaft 24 is positioned over the main conveyer 11 and has a depending arm 25 adapted to be engaged by the control pin 19 on the routing tray, as shown in Figure 5. This rock shaft is operatively connected by a mechanism 26 to the deflector 21, so that when the shaft 24 is rocked by the pin 19 engaging the finger 25, the deflector will be returned to its inoperative dotted line position shown in Figure 4. A similar rock shaft 27, having a depending arm 28 secured thereto and adapted to be engaged by the control pin 19, is also provided over the main conveyer 11, as shown in Figure 4. This shaft is connected by a rod 29 to the deflector 21. The depending fingers 25 and 28 are so connected with the deflector 21 that when the control pin 19 engages the finger 25, the deflector 21 will be moved from the full to the dotted line position shown in Figure 4, and when the control pin subsequently engages the finger 28, the deflector will be returned to its operative position. This mechanism is shown and described in detail in my prior pending application, Serial #169,281, and it is therefore thought unnecessary to further describe same in this application.

The important feature of this invention resides in the novel means provided for automatically spacing the first following article a predetermined distance from the routing tray, when the latter is sent over the conveyer system to operate a diverting mechanism to cause the diversion of articles from the main conveyer to a selected branch conveyer. The purpose of thus spacing the routing tray from the first following article or package is to provide clearance between the tray and the first article to allow sufficient time for the deflector 21 to be moved from inoperative to operative position, after the tray has passed thereby and before the following article reaches the deflector.

The means provided for thus spacing the tray from the first following article or package is shown in Figures 2 and 3, and comprises a power-operated conveyer section 31 and a gravity conveyer section 32, arranged ahead of the power driven section 31. A frame structure 33 is arranged over the conveyer section 31 and has a rock shaft 34 mounted adjacent one end thereof, which has an operative bar 35 secured thereto and normally positioned as shown in dotted lines in Figure 3. A shaft 36 is mounted beneath the conveyer section 32 and has an arm 37 to which one end of a link 38 is pivotally connected, the other end of which, preferably, has an anti-friction roller 39 mounted thereon adapted to be moved into the path of the articles passing over the conveyer 32, as shown in Figure 2. This stop roller is normally positioned as shown in dotted lines in Figure 3, below the surface of the conveyer section 32. The adjacent rollers 41 of the conveyer section 32 are preferably reduced in diameter intermediately of the conveyer to provide guides for the link 38, passing upwardly therebetween. An arm 42 is terminally secured to one side of the shaft 36 and has a rod 43 connecting it with an arm 44 terminally secured to one end of the rock shafts 34. A tension spring 44' yieldably retains the operating bar 35 and the stop roller 39 in their normal dotted line positions, shown in Figure 3. The operating bar 35 is adapted to be engaged by the control pin 19, positioned upon the cross member 17 of the routing tray. Thus, it will be seen, by reference to Figures 2 and 3, that when the routing tray passes from the conveyer section 32 onto the power conveyer section 31 beneath the rock shaft 34, the latter will be actuated by the pin 19 engaging the bar 35, thereby causing the stop roller 39 to be elevated from the dotted line position shown in Figure 3 to its operative position shown in full lines in Figure 2. When thus positioned, the first article or package 45 sent over the conveyer, will engage the stop roller 39 and its travel will be temporarily interrupted, until the stop roller is retracted or moved to its inoperative position beneath the surface of the conveyer.

Means are provided for holding the stop roller in its operative position, shown in Figure 2, and consists of a finger 46 preferably integrally formed with the arm 42 and having its outer end adapted to engage a spring-actuated latch member 47, slidably mounted in a guide 48 secured to the conveyer section 32, as shown. This latch member is normally retained in the positions shown in Figure 3, by means of a compression spring 49. When the stop roller 39 is moved to its operative position, as shown in Figure 2, the finger 46 will engage and depress the latch member 47 and pass beneath it, after which the spring 49 will return the latch member to its normal position over the finger 46, as shown in Figure 2. When thus positioned, the shaft 36 will be locked against movement with the result that the stop roller 39 will be held in its operative position shown in Figure 2.

The means provided for releasing the finger 46 from the latch 47 consists of a bar 51, transversely arranged over the conveyer section 31 at the opposite end of the frame 33. This bar is supported by a shaft 52 having an arm 53 terminally secured thereto, which has a rod 54 connecting it with an upright arm 55 pivotally mounted upon a pin 56, secured to the conveyer section 32. The hub of the arm 55 has a forked member 57 oppositely provided thereon which straddles the reduced end portion 58 of the latch member 47. A pin or cross member 59 is mounted in the reduced end portion 58 of the latch member adapted to be engaged by the forked member 57, so that when the arm 55 is moved from the full to the dotted line position shown in Figure 2, the forked member 47 will engage the pin 59 and move the latch member 47 out of engagement with the finger 46, after which the spring 44 will cause the stop roller 39 to return to its normal inoperative position beneath the surface of the roller section 32.

In the operation of this novel article-spacing mechanism, the routing tray is started over the main conveyer 11 from the central distributing station A, closely followed by a plurality of articles or packages. (See Figure 1.) When the routing tray passes from the gravity conveyer section 32 onto the power driven conveyer section 31, the control pin 19 will engage the operating bar 35 and move it to the position shown in Figure 2, thereby causing the stop roller 39 to be elevated to its operative position above the surface of the conveyer section 32, before the following article reaches the point of the conveyer section 32, at which the stop roller is located. Thus, the travel of the first following article will be temporarily interrupted, as a result of such engagement with the stop roller 39 and, after the control pin at the forward end of the routing tray reaches the opposite end of the frame 33 and engages the bar 51, the latter will be moved to the dotted line position shown in Figure 2, thereby causing the arm 55 to be operated to move the latch member 47 out of engagement with the finger 46 secured to the shaft 36, which will cause the spring 44 to return the stop roller 39 to its inoperative position, after which the first article or package 45, and those following, may continue over the conveyer system, preceded by the routing tray, which will thereafter be spaced a predetermined distance from the leading package. The spacing required between the tray and the following article will be determined by the distance traveled by the routing tray from the time it engages the depending finger 25, which causes the deflector 21 to open, until it subsequently engages the finger 28 and causes the deflector to be moved to its closed operative position. The distance traveled by the routing tray, between these two points, must be completed before the next following article reaches the selected branch conveyer onto which it is to be diverted.

The construction and operation of this novel spacing mechanism is such that when the tray and articles are properly started over the main conveyer 11 from the central distributing point or station A, the tray and leading article, after being passed through the spacing mechanism, will be spaced a certain distance apart which, in this particular case, will be sufficient to allow the deflector 21 to open and permit the routing tray to pass therethrough over the main conveyer and thereafter to move it to its closed position to be engaged by the article, and thus cause its diversion onto the selected branch conveyer.

In this application, the spacing mechanism is shown and described as used in connection with a conveying apparatus, such as set forth in my above mentioned pending applications, but it is to be understood that it may be applicable in connection with other types of conveying apparatus without departing from the scope of the invention.

I claim as my invention:

1. The combination with a conveying apparatus including a conveyer and a routing tray adapted to be sent over said conveyer to actuate certain mechanisms adapted to divert following articles from the conveyer onto a selected branch conveyer, of means adapted automatically to space the routing tray a predetermined distance from the first following article.

2. The combination with a conveying apparatus including a conveyer and a routing tray adapted to be sent over said conveyer to actuate certain mechanisms adapted to divert following articles from the conveyer onto a selected branch conveyer, of means carried by the conveyer and adapted to be engaged by the routing tray to automatically space said routing tray a predetermined distance from the first following article.

3. The combination with a conveying apparatus including a conveyer and a routing tray adapted to be sent over said conveyer to operate certain mechanisms for diverting following articles onto a selected branch conveyer, of a spacing mechanism interposed in said conveyer and operable by the routing tray to temporarily interrupt the travel of the leading article following the routing tray and thereafter releasing it so that said article will be spaced a predetermined distance from said routing tray.

4. The combination with a conveying apparatus including a conveyer and a routing tray adapted to be sent over said conveyer to operate mechanisms for diverting following articles onto a selected branch conveyer, of a spacing mechanism interposed in said conveyer and operable by a control means on said routing tray to temporarily interrupt the travel of the leading article following said tray, while the latter continues onward, and thereafter releasing the article and permitting it to follow the tray, spaced a predetermined distance therefrom.

5. An apparatus of the class described, including a conveyer section and a rounting tray adapted to travel thereover, an article-stopping member normally positioned beneath the surface of said conveyer, operating means mounted over the conveyer and having a connection with said article-stopping member, and control means on the routing tray adapted to engage said operating means to move said member to its operative position to be engaged by an article and to temporarily interrupt the travel of the latter while movement of the tray is continued.

6. An apparatus of the class described, including a conveyer section and a routing tray adapted to travel thereover, a frame arranged over a portion of said conveyer, a rock shaft mounted on said frame, an article-stopping member normally positioned beneath the surface of said conveyer, means connecting said stopping member with said rock shaft, a member secured to the rock shaft and adapted to be engaged by the routing tray to rock said shaft and to move said article-stopping member above the surface of the conveyer to be engaged by an article, and means also operable by the routing tray, after a predetermined travel thereof, to cause the return of said stopping member to its normal position and to allow the articles to follow said routing tray over the conveyer.

7. An apparatus of the class described, including a conveyer section and a routing tray adapted to be sent thereover to direct articles therefrom onto a selected branch conveyer, a frame structure arranged over a portion of said conveyer, a rock shaft mounted at one end of the frame, a stop member normally positioned below the surface of the conveyer and having a connection with said rock shaft, a member secured to the rock shaft and normally depending therefrom, means on the routing tray adapted to engage and actuate said depending member to rock said shaft and to move said stop member into the path of an article following the routing tray, means for temporarily holding said stop member in operative position, and mechanism also operable by the routing tray to cause the return of said stop member to its normal position, whereby the temporarily interrupted article on said conveyer will follow said routing tray and will be spaced a predetermined distance therefrom.

8. An apparatus of the class described including a conveyer section and a routing tray adapted to be sent thereover to direct articles therefrom onto a selected branch conveyer, a rock shaft mounted over the conveyer, a stop member pivotally mounted beneath the conveyer and normally positioned therebelow and having a connection with said rock shaft, a member secured to the rock shaft and normally depending therefrom, control means on the routing tray adapted to engage and actuate said depending member to rock said shaft and to move said stop member into the path of an article following the routing tray, means for temporarily holding said stop member in operative position, and mechanism associated with said stop member and also operable by the control means on said routing tray to cause the return of said stop member to its normal position, whereby the temporarily interrupted article on said conveyer will follow said routing tray, but will be spaced a predetermined distance therefrom.

9. An apparatus of the class described, including a conveyer section and a routing tray adapted to be sent thereover to direct articles therefrom onto a selected branch conveyer, a frame structure arranged over a portion of said conveyer, a rock shaft at one end of the frame having an operating bar secured thereto and normally depending therefrom, an anti-friction stop member normally positioned beneath the surface of said conveyer and having a connection with said rock shaft, means on the routing tray adapted to engage said operating bar to rock said shaft and to move said stop member above the surface of the conveyer to temporarily interrupt the travel of an article thereover, a spring-actuated pawl adapted to retain said stop member in raised operative position, a second rock shaft mounted at the opposite end of the frame and having a member depending therefrom adapted also to be engaged by the routing tray, and said last mentioned rock shaft having a connection with said spring-actuated pawl whereby, when said shaft is rocked by the passage of the routing tray therebeneath, said pawl will be retracted to permit said stop member to return to its normal inoperative position, after which the article interrupted thereby, will follow said routing tray over the conveyer and will be spaced a predetermined distance therefrom.

10. A conveyer, comprising a main and branch lines, means for selectively routing articles from the main conveyer over said branch lines, and means for regulating the distance between the routing means and the first following article to be routed.

11. In a conveying system, a main conveyer, a branch conveyer leading therefrom, mechanism for diverting an article from said main conveyer to said branch conveyer, routing means for operating said mechanism, and means for spacing said routing means from the article to be diverted.

12. In a conveying system, a main conveyer, a branch conveyer leading therefrom, mechanism for diverting an article from said main conveyer to said branch conveyer, routing means for operating said mechanism, and means operated by said routing means for spacing said routing means from the article to be diverted.

In witness whereof, I have hereunto set my hand this 5th day of April, 1927.

MARTIN J. ANDERSON.